Dec. 25, 1956 — R. L. JOHNSON ET AL — 2,775,351
GUN RACK FOR AUTOMOBILE SEATS
Filed Feb. 27, 1953
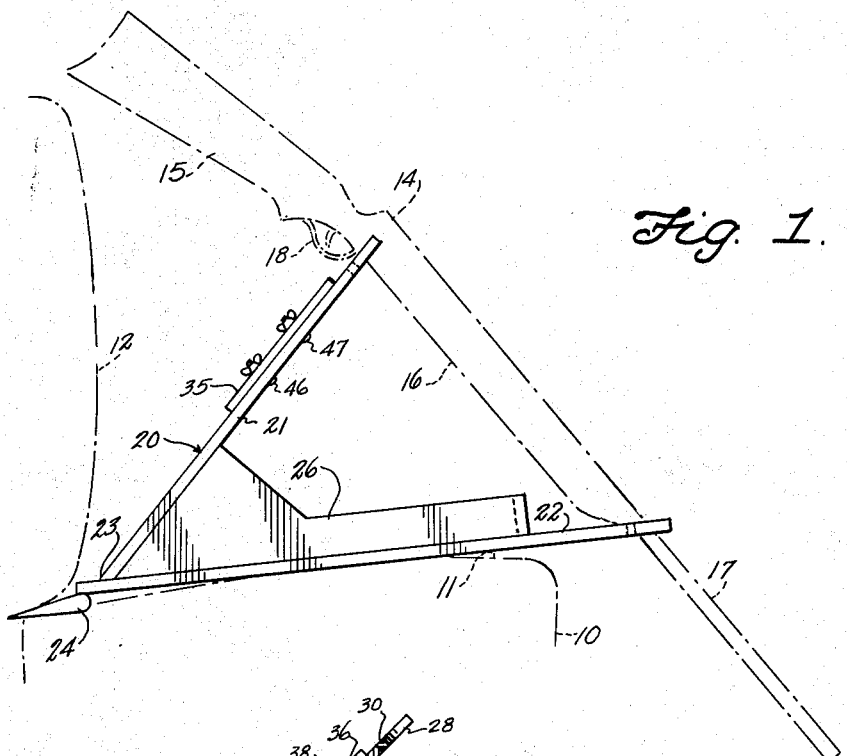
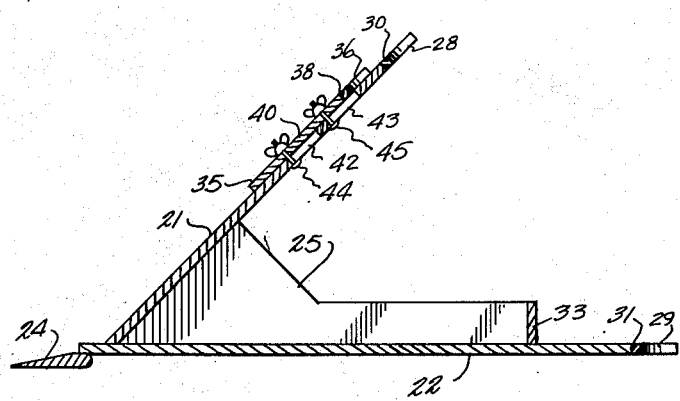
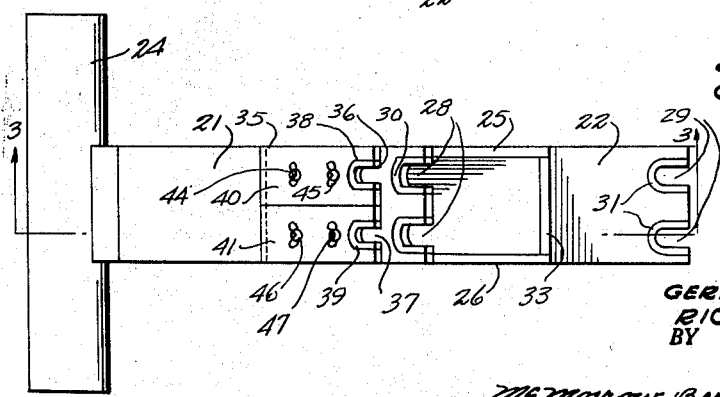
INVENTOR.
GERALD E. JOHNSON,
RICHARD L. JOHNSON,
BY
McMorrow, Berman & Davidson
ATTORNEYS

United States Patent Office 2,775,351
Patented Dec. 25, 1956

2,775,351

GUN RACK FOR AUTOMOBILE SEATS

Richard L. Johnson and Gerald E. Johnson,
Bucyrus, N. Dak.

Application February 27, 1953, Serial No. 339,412

1 Claim. (Cl. 211—64)

This invention relates to portable gun supports and more particularly to a gun support or rack adapted to be removably mounted on an automobile seat for supporting one or more guns in an automobile.

It is among the objects of the invention to provide an improved portable gun rack which can be mounted on an automobile seat and will support one or more guns with their barrels in a downwardly and forwardly inclined position relative to the automobile, so that the guns can be easily placed in and removed from the automobile with their muzzles pointed downwardly; which supports the gun or guns entirely free of the associated seat and in a position from which they can be quickly and easily removed from the automobile; which protects the guns against being damaged or marred while supported on the rack; which provides a compartment for carrying a supply of ammunition; and which is simple and durable in construction, economical to manufacture, easy to use, and neat and attractive in appearance.

Other objects and advantages will become apparent from a consideration of the following description and the appended claim in conjunction with the accompanying drawing wherein:

Figure 1 is a side elevational view of a gun supporting rack illustrative of the invention shown mounted on an automobile seat and supporting a gun;

Figure 2 is a top plan view of the gun supporting rack illustrated in Figure 1; and Figure 3 is a cross sectional view on the line 3—3 of Figure 2.

With continued reference to the drawing, in Figure 1 there is illustrated, in broken lines, an automobile seat 10 having a seat portion 11 and a back portion 12, the bottom edge of which is adjacent the rear portion of the upper surface of the seat portion 11, and there is also illustrated in broken lines a gun 14 having a stock 15, a forearm 16, a barrel 17 extending along the forearm from the adjacent end of the stock with its muzzle disposed outwardly from the end of the forearm remote from the stock, and a trigger guard 18 substantially at the juncture of the stock and the forearm.

A gun supporting rack, generally indicated at 20, is mounted on the seat 10 and comprises a pair of flat bars 21 and 22 having adjoining ends, as indicated at 23, and extending from their adjoining ends divergently of each other with their major cross sectional dimensions extending in the same direction.

The bar 22 is the base bar or plate of the support and is adapted to rest upon the upper surface of the seat portion 11 of the seat, having a length such that it extends from a location adjacent the lower edge of the bottom portion 12 of the seat outwardly beyond the front edge of the seat, as illustrated in Figure 1, and, when the base bar 22 is disposed upon the seat portion 11, as illustrated, the bar 21 is inclined upwardly and forwardly relative to the bar 22 from the adjoining ends of the bars located adjacent the lower edge of the back portion 12 of the seat.

A plate 24 is secured adjacent one edge to the bar 22 at the adjoining ends of the bars 21 and 22 and has a length greater than the width of the bars 21 and 22 and its longitudinal center line disposed substantially at right angles to the longitudinal center line of the bar 22. This plate projects outwardly from the adjoining ends of the bars 21 and 22 and is tapered in thickness away from the adjoining ends of the bars, so that it is easily movable between the lower edge of the back portion 12 and the rear part of the seat portion 11 of an automobile seat to support the gun rack in an upright position on the seat portion of the seat.

The bars 21 and 22 have their opposite longitudinal edges substantially in common, parallel planes, and plates 25 and 26 are disposed between the bars at the respectively opposite longitudinal edges of the interconnected bars to hold the bars in the angular relationship relative to each other at which the bar 21 is inclined upwardly and forwardly from the bar 22, as described above. The angle between the bars 21 and 22 is approximately 45 degrees, and the plates 25 and 26 are disposed in spaced apart and parallel relationship to each other and extend along the bar 22 a distance greater than that at which they extend along the bar 21. At its end remote from the adjoining ends of the bars the bar 21 is provided with spaced apart, gun receiving notches 28, and at its end remote from the adjoining ends of the bars, the bar 22 is provided with spaced apart, gun receiving notches 29. The notches 28 and 29 are lined with strips of elastically compressible material, such as sponge rubber, as indicated at 30 for the notches 28, and 31 for the notches 29.

When the rack is mounted on an automobile seat, in the manner indicated above, a gun 14 can be supported on the rack by engaging the forearm of the gun at the forward side of the trigger guard 18 in one of the notches 28 in the upper bar 21 and the barrel of the gun at the forward end of the forearm 16 in the corresponding notch 29 in the outer end of the bar 22. This will support the gun in a forwardly and downwardly inclined position, as illustrated in Figure 1, with the muzzle of the gun directed toward the floor of the automobile, in which position an accidental discharge of the gun would not endanger persons riding in the automobile and would cause only minor damage to the automobile structure.

By using both of the notches 28 and both of the notches 29, two guns can be carried in side by side relationship on the rack, and it is contemplated that the number of notches in each of the bars can be increased or decreased within practical limits, without in any way exceeding the scope of the invention.

An end plate 33 extends between the front ends of the plates 25 and 26, that is, the ends of these plates nearest the notched end of the bar 22 and the plates 25, 26 and 33 together with the portions of the bars 21 and 22, to which the plates are connected, constitute a compartment or receptacle in which a reserve supply of ammunition for the guns can be carried. In a rack dimensioned to fit properly on an automobile seat the ammunition compartment will carry at least four conventional boxes of shotgun shells and will carry a much larger number of boxes of rifle ammunition.

It is contemplated that the notches 28 and 29 will be dimensioned to receive guns having the maximum thickness of their forearms and barrels, such as double-barreled shotguns, and that it may also be desired to carry guns having less forearm thickness, such as single-barrel shotguns or rifles, on the rack. In order to accommodate the rack to carry guns of different thicknesses, a plate 35 of substantially the same width as the plate 21, but of a length less than the length of the plate 21, is disposed on the upper surface of the plate 21 adjacent the notched end of this plate, and has in its end adjacent the notches 28 a pair of spaced apart notches 36 and 37 of a width less than the width of the notches 28. The notches 36 and 37 are lined with strips of elastically compressible material, such as sponge rubber, as indicated at 38 and 39, and the plate 35 is preferably divided longitudinally and medially of the width thereof into two separate portions 40 and 41 with the notch 36 disposed in one end of the portion 40 and the notch 37 in the corresponding end of the portion 41. The plate 21 is provided with longitudinally extending slots, as indicated at 42 and 43 in Figure 3, there being two slots disposed beneath the plate portion 40 medially of the width of this plate portion and spaced apart longitudinally thereof and two corresponding slots disposed beneath the plate portion 41 medially of the width of this plate portion and spaced apart longitudinally thereof.

Bolts 44 and 45 extend one through each of the slots disposed beneath the plate portion 40 and through corresponding apertures in this plate portion and receive wing nuts on their ends at the upper or outer side of the plate portion 40 to secure this plate portion in selected positions longitudinal adjustment relative to the plate or bar 21, and similar bolts 46 and 47 extend one through each of the notches in the plate 21 below the plate portion 41 and through corresponding apertures in the portion 41 and receive wing nuts on their ends at the upper or outer side of the plate portion 41 to secure this plate portion in selected positions of longitudinal adjustment relative to the plate or bar 21.

When it is desired to carry one narrower gun, such as a single-barreled shotgun or rifle, the wing nuts disposed at the outer surface of one of the plate portions 40 or 41 are loosened and the corresponding plate portion moved forwardly until the notch therein overlies the corresponding notch in the bar 21. Obviously, both of the plate portions 40 and 41 may be moved to operative position, if it is desired to carry two narrow guns, both may be moved to retracted position if it is desired to carry two wide guns, or either one may be moved to operative position if it is desired to carry one narrow gun, the rack then being effective to also carry one wide gun, if that is desired.

The length of the bar 24 is sufficient to firmly support the rack in upright position on an automobile seat with one or more guns supported on the rack, and the rack may, if desired, be mounted on either the back or the front seat of an automobile and positioned adjacent the mid-length location of the seat, so that the guns will be convenient to either person riding on the seat. With the guns supported in a forwardly and downwardly inclined position on the rack, it is easy to place the guns on the rack and remove them from the rack and from the automobile while maintaining the guns pointed downwardly to avoid injury to any person or damage to the automobile by an accidental shot.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

A gun rack comprising a pair of flat bars fixedly connected together at one end and diverging at acute angles to each other from said ends, said bars having longitudinal notches opening upon their other ends to receive longitudinally spaced portions of a gun, each notch being formed with straight sides paralleling the longitudinal center line of the bar in which it is formed for substantially the full length of the notch; and a plate mounted on one of the bars for sliding movement in a path paralleling said longitudinal center line and formed with a longitudinal notch opening upon one end of the plate, the notch of the plate being aligned longitudinally with the notch of said one bar and having straight sides paralleling those of the bar notch, the sides of the plate notch being spaced apart a distance less than the distance between the sides of the bar notch and the plate being slidable into a position registering the notches of the plate and of said one bar, thus to substitute the notch of the plate for the notch of said one bar as a means for receiving an adjacent portion of the gun.

References Cited in the file of this patent

UNITED STATES PATENTS

| Number | Name | Date |
|---|---|---|
| 381,437 | Smith | Apr. 17, 1888 |
| 1,204,813 | Murray | Nov. 14, 1916 |
| 1,689,091 | Watt | Oct. 23, 1928 |
| 1,827,969 | Calkins | Oct. 20, 1931 |
| 1,912,514 | Curtis et al. | June 6, 1933 |
| 2,016,421 | Eichner | Oct. 8, 1935 |
| 2,130,197 | Schick | Sept. 13, 1938 |
| 2,308,533 | Owen | Jan. 19, 1943 |
| 2,322,403 | Van der Kieft | June 22, 1943 |
| 2,533,541 | Warring | Dec. 12, 1950 |
| 2,692,069 | Winters et al. | Oct. 19, 1954 |